(12) United States Patent
Leiber et al.

(10) Patent No.: US 8,541,923 B2
(45) Date of Patent: Sep. 24, 2013

(54) DUAL-ROTOR MOTOR HAVING HEAT DISSIPATION

(75) Inventors: Heinz Leiber, Oberriexingen (DE); Thomas Leiber, München (DE)

(73) Assignee: CPM Compact Power Motors GmbH, Unterfohring (DE)

( * ) Notice: Subject to any disclaimer, the term of this patent is extended or adjusted under 35 U.S.C. 154(b) by 0 days.

(21) Appl. No.: 13/255,005

(22) PCT Filed: Mar. 5, 2010

(86) PCT No.: PCT/EP2010/001382
§ 371 (c)(1), (2), (4) Date: Feb. 21, 2012

(87) PCT Pub. No.: WO2010/099974
PCT Pub. Date: Sep. 10, 2010

(65) Prior Publication Data
US 2012/0133221 A1 May 31, 2012

(30) Foreign Application Priority Data

Mar. 5, 2009 (DE) .......................... 10 2009 011 383

(51) Int. Cl.
*H02K 9/19* (2006.01)
(52) U.S. Cl.
USPC .............................. 310/214; 310/215; 310/52
(58) Field of Classification Search
USPC .......................... 310/54, 57–59, 89, 214–215
See application file for complete search history.

(56) References Cited

U.S. PATENT DOCUMENTS

| | | | | |
|---|---|---|---|---|
| 4,994,700 | A * | 2/1991 | Bansal et al. | 310/215 |
| 5,725,047 | A * | 3/1998 | Lopez | 165/149 |
| 6,037,683 | A * | 3/2000 | Lulay et al. | 310/52 |
| 6,114,784 | A * | 9/2000 | Nakano | 310/59 |
| 6,722,005 | B2 * | 4/2004 | Sauter et al. | 29/40 |
| 6,847,137 | B2 * | 1/2005 | Furuse | 310/59 |
| 6,864,604 | B2 * | 3/2005 | Nakano et al. | 310/57 |
| 7,888,828 | B2 * | 2/2011 | Takahashi et al. | 310/54 |
| 2002/0117935 | A1 * | 8/2002 | Kanazawa et al. | 310/263 |
| 2009/0195108 | A1 * | 8/2009 | Rippel | 310/214 |
| 2009/0267427 | A1 * | 10/2009 | Yoshida et al. | 310/54 |

FOREIGN PATENT DOCUMENTS

| | | |
|---|---|---|
| EP | 1164688 A2 | 12/2001 |
| JP | 2003299274 A | 10/2003 |
| JP | 2005137126 A | 5/2005 |

OTHER PUBLICATIONS

International Preliminary Report on Patentability issued in related International Appilcation No. PCT/EP2010/001382 on Dec. 6, 2011.

* cited by examiner

*Primary Examiner* — Tran Nguyen
*Assistant Examiner* — Naishadh Desai
(74) *Attorney, Agent, or Firm* — Novak Druce Connolly Bove + Quigg LLP

(57) ABSTRACT

An electric motor may include an outer rotor and an inner rotor, with a stator, which carries the excitation coils, formed as a hollow cylinder and engaging in the pot-shaped outer rotor and being connected to the housing or to a part of the electric motor fixedly connected to the housing, and where the electric motor may further include a water cooling and an air cooling system.

12 Claims, 2 Drawing Sheets

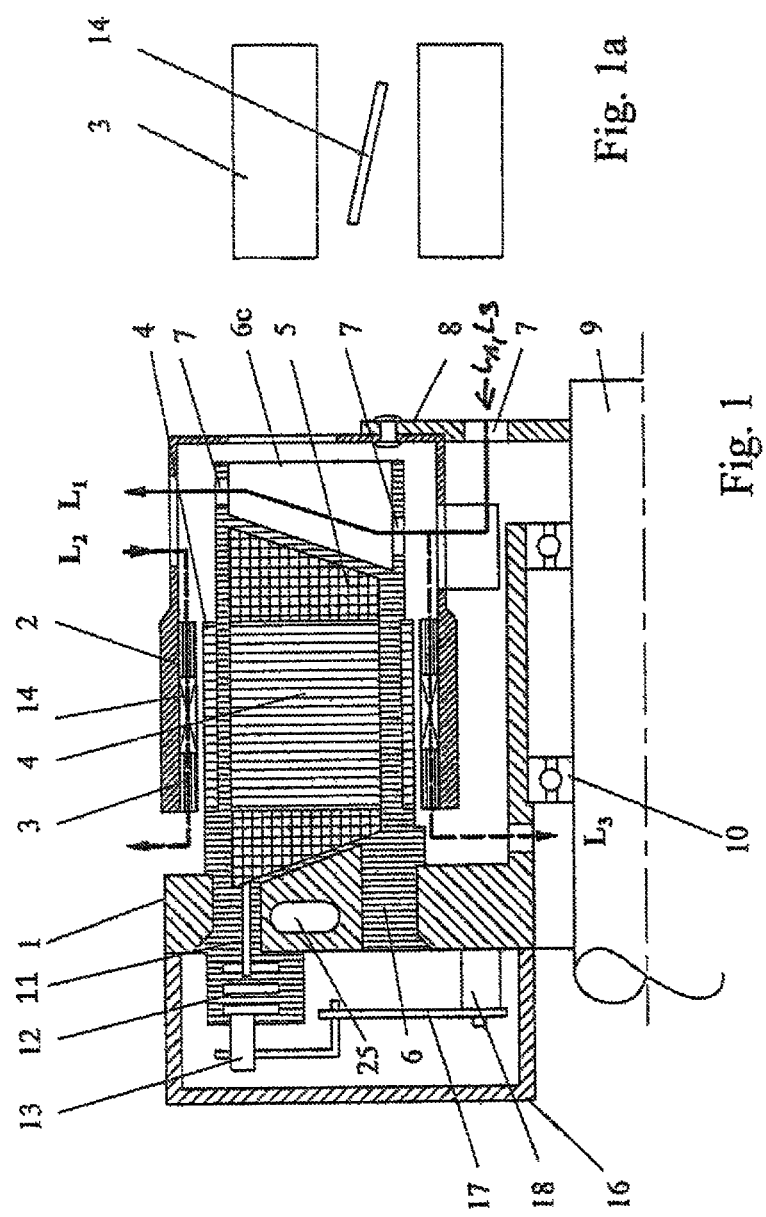

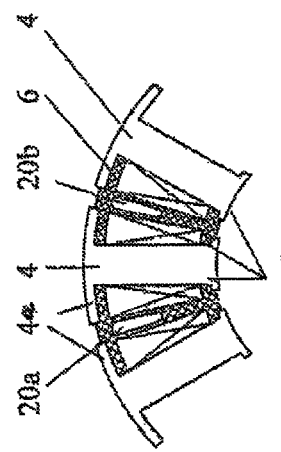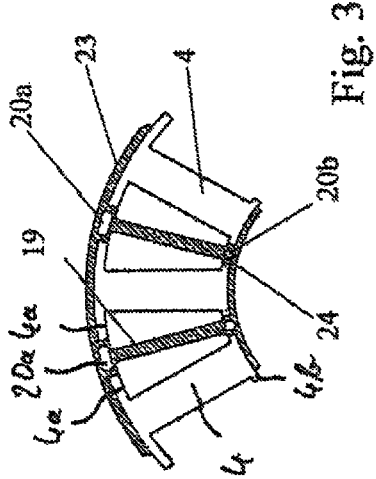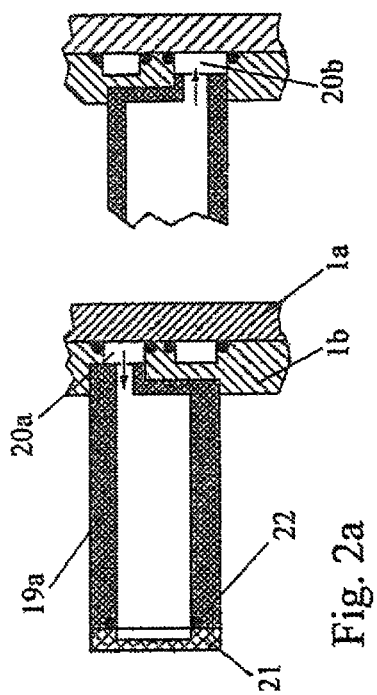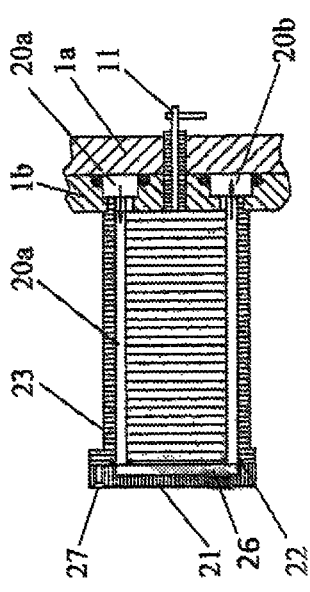

DUAL-ROTOR MOTOR HAVING HEAT DISSIPATION

CROSS-REFERENCE TO RELATED APPLICATIONS

This application is a 35 U.S.C. 371 National Stage Application of International Application No. PCT/EP2010/001382, filed Mar. 5, 2010, claiming priority from German Patent Application No. 10 2009 011 383.5, filed Mar. 5, 2009, the entire contents of which are incorporated herein by reference in their entirety.

The present invention relates to a double rotor motor according to the preamble of claim 1.

PRIOR ART

With powerful electrical machinery there is the problem of heat dissipation of the power loss from the excitation or field coils. In generators it is known to provide a central fan impeller, which serves for air cooling. Also, generators with water cooling in the stator housing are known. Both are described in the Bosch Handbook (Edition and ISBN No. to be specified).

A cooling by convection or heat dissipation via the generator mounting is generally not sufficient.

With even more powerful electrical machinery, such as for example engines for hybrid or electric vehicles, water cooling is used for heat dissipation, in which suitable water circulations are provided in the housing. This so-called waste heat is also used for vehicle heating.

From WO 2004/004098 a double rotor motor is known, in which a fan blade is arranged on the front of the rotor facing towards the housing. These fan blades do not generate a targeted flow of air. However, it appears to be sufficient for the non-directed flow of air for the washing machine application in which the motor disclosed in WO 2004/004098 is used.

OBJECT AND IMPLEMENTATION OF THE INVENTION

The object of the present invention is to provide a double rotor motor with a good heat dissipation so that the motor can be used for relatively high power outputs.

This object is achieved according to the invention with a motor having the features of claim 1. Advantageous embodiments are disclosed by the features of the subclaims.

It is known that the efficiency depends to a large extent on, among other things, the power loss of the excitation coil and also the temperature, i.e. the heat dissipation. For example, a rise in temperature of 50° corresponds to an increase in the coil power loss of around 20%. Therefore, especially for electrical machinery of high outputs power, solutions are required by means of which the physically optimum heat removal can be achieved.

In double rotor motors there is the problem that the excitation coil and yoke is self-supporting, and a good heat dissipation to the housing is possible only through the side or surface of the excitation coils facing towards the housing. For all the remaining five surfaces of the excitation coils there is only the possibility of convection, resulting in a large temperature drop and also an accumulation of heat.

To solve this problem the invention proposes that either a targeted flow of air via a plurality of fan blades or fans is generated, or additionally water cooling is provided in the housing. Most effective are water channels that surround the coil and are connected to channels in the housing. For this purpose various embodiments are possible. The ventilation and water channels can be realised particularly simply and inexpensively if these are either cast, or preferably injection moulded, into the support structures between the excitation coils. To produce and seal these channels the support structure can be closed on the outside by means of a cover. The inflow channel is thereby connected to the return channel. This cover advantageously also increases the rigidity of the support structure and can optionally also be reinforced with an external reinforcement, such as for example ribs or reinforcing elements. The cover can be omitted if a U-shaped tube or profiled section is cast or injection moulded.

The electrical control unit also requires good heat dissipation. Preferably the control unit is connected in a thermally conducting manner to the housing cooled by the water cooling system.

Various possible embodiments are described in more detail hereinafter with the aid of the accompanying drawings, in which:

FIG. 1: shows the basic structure of the double rotor motor with air and water cooling;

FIG. 2: shows the yokes with excitation coils as well as water channels integrated in the double-T supports;

FIG. 2a: shows the inflow and outflow of the water channels;

FIG. 3: shows an expanded T-support structure with water channels at the top and bottom;

FIG. 3a: is an alternative form of the inflow and outflow of the cooling water.

FIG. 1 shows the basic structure of a double rotor motor with housing 1, bearing 10, rotor shaft 9, flange 8 and double rotor 2, which comprises permanent magnets 3. A support structure 6, which also surrounds yoke 4 and excitation coil 5, is injection moulded in the housing 1. The support structure 6 extends in the radial and axial directions between in each case two adjacent yokes 4 and excitation coils 5 and is anchored in recesses of the housing 1. The anchoring is formed in the injection moulding process, in which the injection moulding compound is cast into the recesses and around the yoke and excitation coils.

Part of a section through the motor is shown in FIGS. 2 and 3. The coil 5 is connected in a known manner via magnet wire 11 to a punched mesh 12, on which all magnet wires make contact. A connection pin leads to the printed circuit board 17 of the ECU. Water channels, which are described in more detail hereinafter, are provided in the housing.

FIG. 1 shows the air feed for cooling the excitation coil. Air stream L1 is generated by a fan impeller 8 connected to the rotor 2, 2a, 2b, the air stream from the fan impeller being guided through recesses 7 and rib structures provided to increase the surface area, and cools the front side of the excitation coils 5. Two further air streams L2 and L3 are generated by blades 14 between the magnets 3 of the outer and inner rotor 2a, 2b and guide the cooling air onto and past the outer poles 4a, 4b of the yokes 4 with excitation coils 5 located underneath. The heat from the excitation coils 5 connected to the housing 1 is conducted directly into the housing 1 and dissipated externally through its cooling water channel 25. In this way heat from the whole surface of the coil 5 is dissipated.

Also, the power section of the motor ECU needs to be cooled. It is possible to utilise the water-cooled housing, the power section preferably being screwed onto the web 18 of the housing 1. This web is preferably located in the immediate vicinity of the cooler inflow channel.

FIG. 2 shows a further very effective solution for the heat dissipation. Here, a water channel 20 is provided in the support structure 6 of the yokes 4, which feeds the water via 20a and removes the water via 20b. A side view of this embodiment is illustrated in FIG. 2a. This shows the inflow into the support structure 6, which is injection moulded or cast directly into the housing 1. A cover 21 with seal 22 serves for further guidance of the cooling water into the adjacent support structure 6. This cover 21 can at the same time serve as external reinforcement with an additional structure for the air cooling, corresponding to FIG. 1.

In FIG. 3 the water channels 20a, 20b are arranged at the top and bottom in an annular support structure 23, 24. This support structure surrounds both yoke teeth 4 and is characterised by a particularly high rigidity in both the tangential and radial directions. A side view of the feed from the water channel 20a and drainage into the channel 20b is shown in FIG. 3a. The housing 1 must for this purpose be in two parts, namely the housing parts 1a and 1b. Since pressurised water is used, the channels 20a, 20b must be sealed. For the same reason the cover 21 is secured to the support structure 23 by rivets 27. The magnet wires 11 for the connection to the punched mesh are led through the housing. To avoid the cover 21, a U-shaped tube 24 for conveying the water can also be injection moulded or cast into the support structures 6, 19.

This can also have a profile especially adapted to the support. The advantage of the tube is that in addition to dispensing with the cover, no particular measures have to be taken in the injection moulding process to ensure hermeticity.

The embodiments show that, with little effort and expenditure, good thermal conduction can be achieved by air or water cooling or additionally by both. This provides the basis for an unusually compact motor with a high output and very good efficiency.

LIST OF REFERENCE NUMERALS

1 Housing
1a Outer housing
1b Inner housing
2 Double rotor
3 Permanent magnets
4 Yoke
5 Excitation coil
6 Support structure
6a Support structure with water channel in the middle
6b Support structure with water channel at the top and bottom
6c External reinforcement
7 Recesses for air flow
8 Rotor flange
9 Rotor shaft
10 Shaft bearing
11 Magnet wire
12 Pressed screen/punched mesh
13 Connection pin
14 Fan blade between the magnets
15 Fan blade on the inner rotor
16 ECV housing
17 Printed circuit board
18 Heat dissipation from the printed circuit board and power part to the housing
19a Double T support, inner
20a Water channel inlet
20b Water channel outlet
21 Cover and outer reinforcement
22 Seal
23 Annular support structure
24 Tube
25 Water channel in the housing
26 Connecting channel
27 Rivet
L1 Air stream 1
L2 Air stream 2
L3 Air stream 3

The invention claimed is:

1. An electric motor comprising:
a pot-shaped outer rotor;
an inner rotor; and
a stator configured to carry excitation coils, wherein the stator is formed as a hollow cylinder and engages in the outer rotor and is connected with its front face to a housing or to a part of the electric motor fixedly connected to the housing, the stator comprising yokes containing the excitation coils and supports arranged between the yokes;
wherein the electric motor has a water cooling system and an air cooling system, wherein the water cooling system is configured to cool the excitation coils, the housing, or both;
wherein the supports comprise at least one channel for water cooling in a region between adjacent pole shoes of the yokes, the at least one channel including an inflow channel, a return channel, and a connecting channel configured to connect the inflow channel and the return channel.

2. The electric motor according to claim 1, wherein the electric motor comprises at least one fan impeller or fan blade arranged on the rotor.

3. The electric motor according to claim 1, wherein the cooling channels are formed by a casting process or injection molding process by suitable shaping of the mold or by insert parts in the mold.

4. The electric motor according to claim 1, wherein the connecting channel is formed by a bent tube or hose.

5. The electric motor according to claim 1, further comprising a cover arranged on the stator to form the connecting channel between the stator and the cover.

6. The electric motor according to claim 1, wherein the housing comprises channels through which cooling water flows.

7. The electric motor according to claim 1, wherein a control unit is arranged in or on the housing.

8. The electric motor according to claim 1, wherein at least one of the yokes is of double T-shaped cross-section.

9. The electric motor according to claim 7, wherein the control unit is integrated in or on the housing.

10. The electric motor according to claim 5, wherein the inflow channel and the outflow channel enter and exit, respectively, the support on one side of the stator, and wherein the cover is arranged on the stator to form the connecting channel between the inflow channel and the return channel on the one side of the stator.

11. The electric motor according to claim 5, wherein the cover is attached to one side of the support.

12. The electric motor according to claim 11, wherein the cover is attached to the support using at least one insertable fastener.

* * * * *